(No Model.) 2 Sheets—Sheet 1.
C. W. BAIRD.
HAY RAKE AND LOADER.
No. 560,770. Patented May 26, 1896.
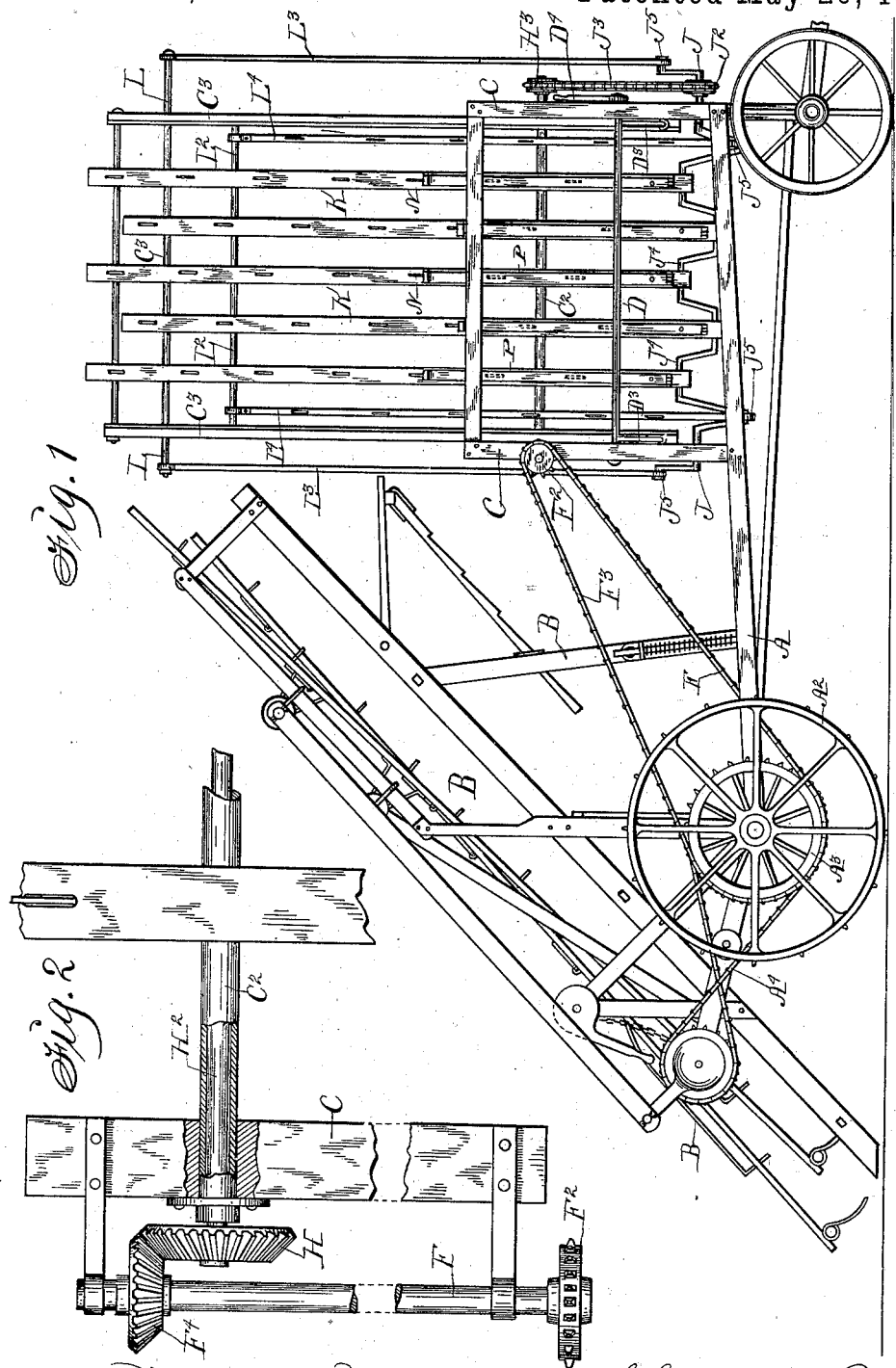
Witnesses:
W. P. Smith.
R. H. Orwig.
Inventor: Charles W. Baird
By Thomas O. Orwig, Atty.

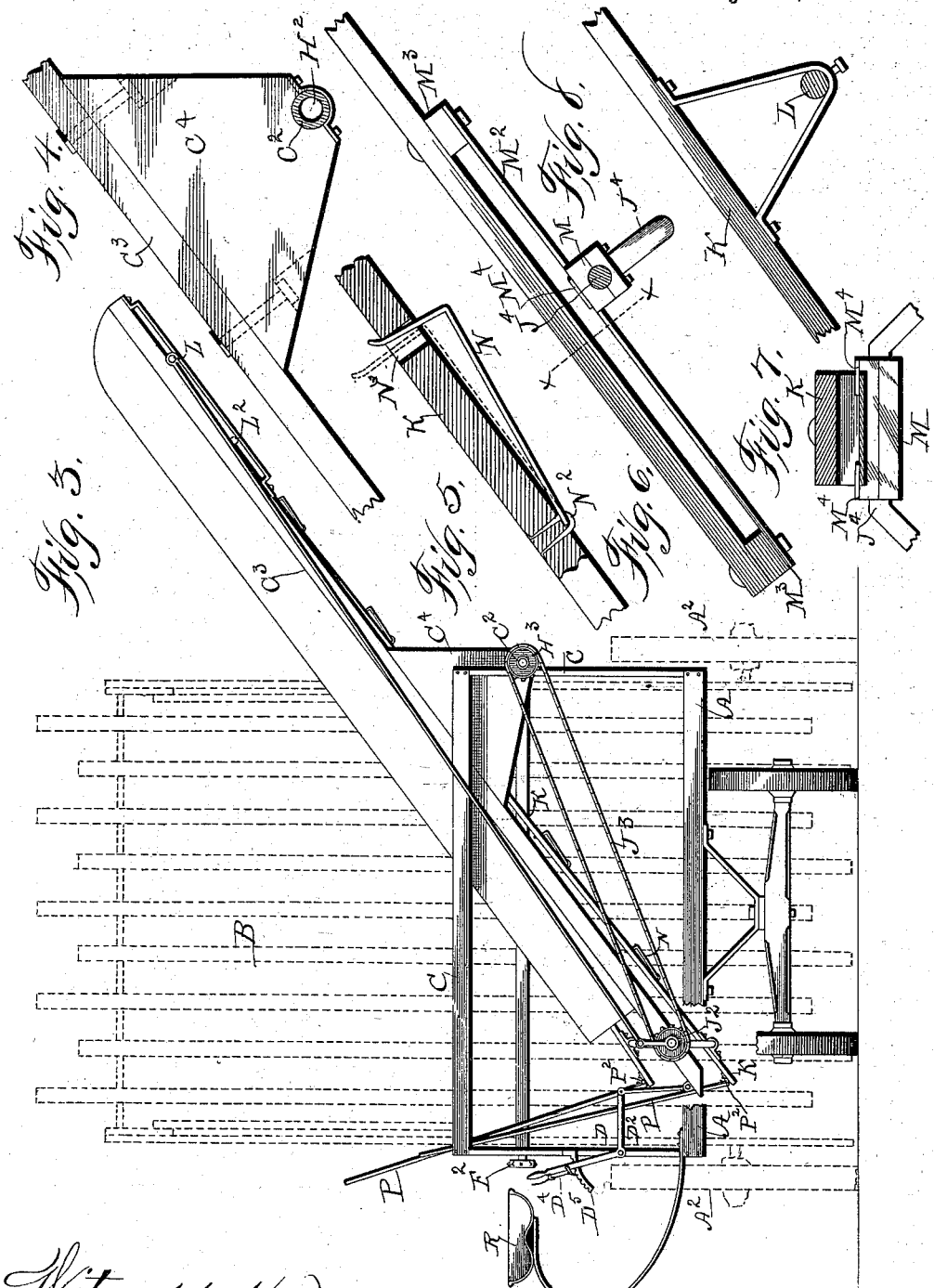

UNITED STATES PATENT OFFICE.

CHARLES W. BAIRD, OF MILLERSBURG, IOWA.

HAY RAKE AND LOADER.

SPECIFICATION forming part of Letters Patent No. 560,770, dated May 26, 1896.

Application filed March 21, 1892. Serial No. 425,800. (No model.)

*To all whom it may concern:*

Be it known that I, CHARLES W. BAIRD, a citizen of the United States of America, residing at Millersburg, in the county of Iowa and State of Iowa, have invented a new and useful Hay Rake and Loader, of which the following is a specification.

My invention consists in the improved side-delivery hay rake and loader hereinafter set forth, pointed out in my claims, and illustrated in the accompanying drawings, in which—

Figure 1 is a side elevation of the complete device. Fig. 2 is an enlarged detail view of part of the mechanism employed in imparting motion from the traction-wheel to the elevator-bars. Fig. 3 is a front end view of the forward elevator, showing the position of the rake and elevator by dotted lines. Fig. 4 is a detail view of the pivotal connection between the frame of the forward elevator and the supporting-frame device. Fig. 5 is a longitudinal sectional view of a section of one of the elevating-bars to illustrate the connection of the hay-engaging tines, whose operation is illustrated by the dotted lines. Fig. 6 is a detail view of the connection between the crank-arms and the elevator-bars. Fig. 7 is a transverse sectional view through the line $x\ x$ of Fig. 6, and Fig. 8 is a detail side view illustrating the connection between the tops of the elevator-bars and their connecting-bars.

Referring to the accompanying drawings, the reference-letter A designates an oblong frame mounted on wheels and adapted to be advanced by draft-animals. The traction-wheels $A^2$ in the rear of the frame have the sprocket-wheels $A^3$ fixed to the rotatable axle thereof.

B represents a hay rake and loader such as are now in common use. It is attached to the rear end of the frame A and extends in the plane of the said frame. It is operated by means of a sprocket-chain $A^4$ traveling upon the sprocket-wheel $A^3$. Inasmuch as the construction of the rake and loader B forms no part of my invention, a detailed description thereof is deemed unnecessary.

C represents an auxiliary supporting-frame secured to the forward end of the frame A in vertical alinement with the forward end of the elevator B. This frame is for the purpose of supporting the frame of the hay-elevator, which is connected therewith as follows:

$C^2$ is a tubular bar fixed to the side of the frame C near its top portion. $C^3$ is a frame composed of two parallel side pieces and a cross-brace at the top. It is extended upwardly from the side of the trucks at an angle approximating forty-five degrees and is pivotally connected with the tubular bar $C^2$ by means of the frame $C^4$. Its lower end has means connected therewith for adjusting the frame to different angles as follows:

D represents a rock-shaft having its bearings in the frame C.

$D^2$ are horizontal arms extended outwardly therefrom and pivotally connected with the connecting-links $D^3$, which latter are attached to the lower ends of the frame $C^3$. This rock-shaft is operated by means of the lever $D^4$.

$D^5$ represents a segmental rack secured to the frame C to be engaged by a spring-actuated pawl on the lever $D^4$, whereby the frame $C^3$ may be secured at any desired angle.

F represents a rotatable shaft mounted in the rear end of the frame C. On the one end is fixed the sprocket-wheel $F^2$, which is connected with the sprocket-chain $F^3$. The opposite end of this shaft has secured thereto the bevel gear-wheel $F^4$, which latter is in mesh with a like wheel H, fixed to a rod $H^2$. This rod is extended through the tubular bar $C^2$ to the opposite side of the frame, where a sprocket-wheel $H^3$ is fixed thereto.

J is a crank-shaft having a plurality of crank-arms formed thereon, mounted in the lower end of the frame $C^3$. It has a sprocket-wheel $J^2$, secured near its forward end portion, to which motion is imparted from the sprocket-wheel $H^3$ by means of the sprocket-chain $J^3$. The crank formations on the central portion of the shaft J are designated by the symbol $J^4$ and those on the extremes thereof $J^5$.

K represents elevator-bars between the sides of the frame $C^3$ and provided with tines N for engaging hay, which will be hereinafter more fully described.

L and $L^2$ represent cross-bars reciprocally connected with the top portion of the frame $C^2$, the one above the other. These bars are operated by means of the connecting-bars $L^3$ and L$^4$, respectively, which are rotatably connected with the outer crank-arms J$^5$, which are of a greater length than the arms J$^4$. The elevators K are attached to the cross-bars L and L$^2$ alternately and are reciprocated thereby, and their lower ends have a sliding connection with the crank-arms J$^4$, which connection will be hereinafter more fully described. It will now be obvious that the elevator-bars have a slight rotary motion imparted to them by the crank-shaft, and also an independent reciprocating motion from the cross-bars at their tops.

M represents a bearing-block in which the crank-shaft J operates.

M$^2$ is a flat bar fixed to the bar K and held separated therefrom by the blocks M$^3$.

M$^4$ are clips secured to the bearing-block M and overlapping the sides of the part M$^2$.

The tines N for engaging hay are formed of a piece of wire pivotally connected with the under side of the elevator-bars by means of the staples H$^2$. The tines are extended upwardly through the bore N$^3$ and inclined to normally engage the forward edge of the bore M$^3$. This arrangement, it will be seen, will allow the teeth to swing upwardly when being advanced to engage the hay and to drop downwardly by gravity out of engagement with the hay when being reversed, and it also dispenses with the use of a separate inclined plane beneath the elevator-bars, as the hay rests upon the same bars that advance or elevate it. By thus combining automatically-operating tines with the bars they will be lifted upward by the resistance of the hay on top of the bars and rise sufficiently high at their free ends to prevent the mass of hay from moving backward relative to the bars, which serve the purpose of an inclined plane for supporting the movable hay as it is held thereon by means of the tines, and when the hay drops off the upper ends of the bars the tines, by force of gravity, will drop so as to be out of engagement with the hay and in position to be engaged and elevated by the hay when the upward stroke is commenced. It is obvious that if the tines projected above the bars the same distance at all times, as required to prevent hay from sliding downward on the bars, the downward motions of the bars would cause the tines at their lower ends to push the hay downward in place of allowing the ends of the tines to be slipped under the hay to be drawn upward thereby, and then, in their raised position, to push the hay upward.

P represents guide-bars hinged to the lower end portions of the elevator-bars by means of the hinges P$^2$ and resting upon the top of the frame C for the purpose of receiving hay from the rear elevator and directing it to the forward elevator.

R is a seat secured to the side of the device in juxtaposition to the operating-lever D$^4$, upon which the driver and operator may seat himself and control the elevation of the forward elevator, and also control the relative positions of the machine and wagon upon which hay is being loaded, so that it may be deposited evenly throughout the entire length of the said wagon.

Having thus described my invention, what I claim as new, and desire to secure by Letters Patent, is—

1. In a hay rake and loader, a straight bar having a hinged connection with the lower end of a straight hay-elevating bar having teeth projecting upward, and a fixed support for the upper end portion of said hinged bar upon which the hinged bar can slide, in the manner set forth, to aid in delivering hay from the rear end of the machine to a wagon at the side of the machine.

2. In a hay-rake and side-delivery loader the combination of a frame mounted upon wheels, a hay rake and elevator mounted upon the frame, an elevator mounted on the forward end of the frame extended approximately at right angles to the frame, and having a plurality of alternately-operated elevator-bars and guide-bars, hinged to the lower ends of said elevator-bars and extending upwardly and having a stationary support over which they may slide, substantially in the manner set forth for the purposes stated.

CHARLES W. BAIRD.

Witnesses:
GARRET N. BROWN,
CURTIS ADAMS.